United States Patent
Lin (10) Patent No.: US 12,348,054 B2
(45) Date of Patent: Jul. 1, 2025

(54) WIRELESS POWER TRANSMITTER CIRCUIT HAVING OVP CONTROL FOR RECEIVER CIRCUIT AND CONTROL CIRCUIT AND METHOD THEREOF

(71) Applicant: Richtek Technology Corporation, Zhubei (TW)

(72) Inventor: Fu-Chi Lin, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 4 days.

(21) Appl. No.: 18/485,841

(22) Filed: Oct. 12, 2023

(65) Prior Publication Data
US 2024/0154464 A1 May 9, 2024

(30) Foreign Application Priority Data
Nov. 9, 2022 (TW) ................... 111142824

(51) Int. Cl.
*H02J 50/12* (2016.01)
*H04B 5/79* (2024.01)

(52) U.S. Cl.
CPC ............... *H02J 50/12* (2016.02); *H04B 5/79* (2024.01)

(58) Field of Classification Search
CPC .................. H02J 50/12; H04B 5/79
See application file for complete search history.

(56) References Cited

U.S. PATENT DOCUMENTS

| | | | |
|---|---|---|---|
| 2020/0119579 A1* | 4/2020 | Niwa | H02J 7/0029 |
| 2020/0274439 A1* | 8/2020 | Yang | H02M 1/36 |
| 2021/0343470 A1* | 11/2021 | Los | H01F 38/14 |
| 2022/0037927 A1 | 2/2022 | Lee et al. | |
| 2022/0255355 A1 | 8/2022 | Egenter et al. | |

* cited by examiner

Primary Examiner — Lincoln D Donovan
Assistant Examiner — Alex W Lam
(74) Attorney, Agent, or Firm — Tung & Associates (57) ABSTRACT

A wireless power transmitter circuit includes: a power stage circuit including plural switches coupled to a resonant transmitter circuit, wherein the resonant transmitter circuit includes a transmission coil and a resonant capacitor which are coupled to each other; and a transmission control circuit controlling the power stage circuit to convert an input power to a driving power according to a pulse width modulation (PWM) control signal when a corresponding wireless power receiver circuit is near by the resonant transmitter circuit. The driving power drives the resonant transmitter circuit to generate a wireless transmitting power, which is supplied to the corresponding wireless power receiver circuit. When a variation rate of a driving current of the driving power with respect to time exceeds a variation rate threshold, an operation parameter of the power stage circuit is adjusted to reduce a power level of the wireless transmitting power.

30 Claims, 10 Drawing Sheets

WIRELESS POWER TRANSMITTER CIRCUIT HAVING OVP CONTROL FOR RECEIVER CIRCUIT AND CONTROL CIRCUIT AND METHOD THEREOF

CROSS REFERENCE

The present invention claims priority to TW 111142824 filed on Nov. 9, 2022.

BACKGROUND OF THE INVENTION

Field of Invention

The present invention relates to a wireless power transmitter circuit; particularly, it relates to such a wireless power transmitter circuit having an over voltage protection (OVP) for a receiver circuit. The present invention also relates to a transmission control circuit and a transmission control method for use in such a wireless power transmitter circuit.

Description of Related Art

Figure 1:
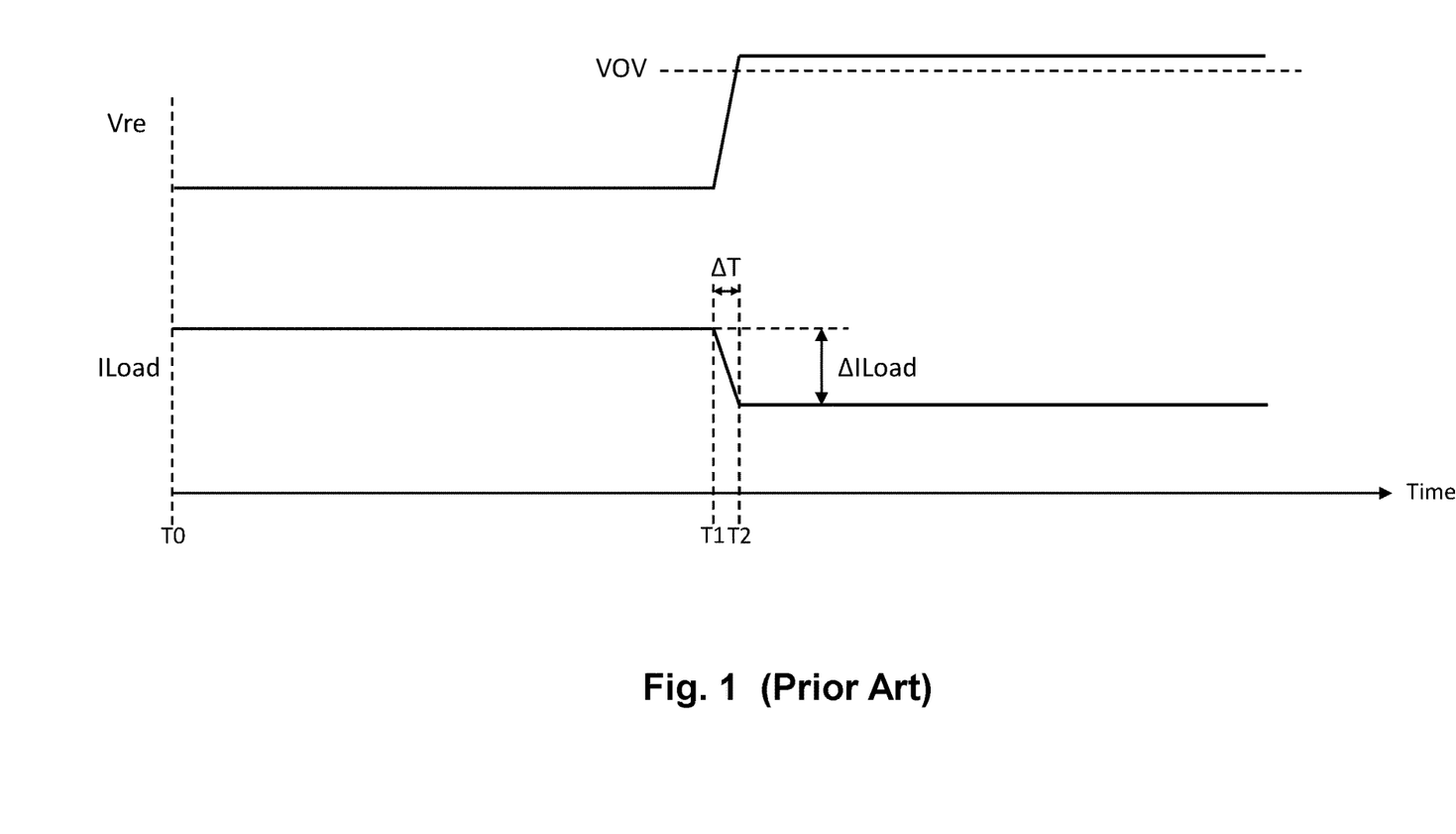
FIG. 1 shows a signal-time relationship diagram of a conventional wireless power receiver circuit.

Please refer to FIG. 1, which shows a signal-time relationship diagram of a conventional wireless power receiver circuit. In a situation where a wireless power receiver circuit is near by a conventional wireless power transmitter circuit, as shown in FIG. 1, in a power supply stage from time point T0 to time point T1, the conventional wireless power transmitter circuit supplies a wireless power to the corresponding wireless power receiver circuit; during this stage, because the power level required by a load in the wireless power receiver circuit is relatively higher, the level of a load current Iload is relatively higher, whereas, the level of a receiving voltage Vre of the wireless power receiver circuit remains at a normal operation level, i.e., under an over voltage protection (OVP) threshold VOV.

However, the prior art shown in FIG. 1 has the following drawback. During the power supply stage, if the power level required for the load in the wireless power receiver circuit drops rapidly in a short time (for example, in a case where the load in the wireless power receiver circuit is suddenly removed), the level of the receiving voltage Vre will sharply increase to exceed the OVP threshold VOV, which may damage the wireless power receiver circuit. To elaborate in more detail, as shown by the period from time point T1 to time point T2 in FIG. 1, the level of the load current Iload drops rapidly. ΔILoad shown in FIG. 1 denotes a level variation amount within ΔT (i.e., the period from time point T1 to time point T2 in FIG. 1), and the variation rate of the load current Iload over time can be represented as: ΔILoad/ΔT. When an absolute value of the variation rate is higher than a threshold, as described above, the level of the receiving voltage Vre will sharply increase to exceed the OVP threshold VOV, which may damage the wireless power receiver circuit.

As compared to the prior art in FIG. 1, the present invention is advantageous in that: the wireless power transmitter circuit of the present invention provides a function of over voltage protection (OVP) for the receiver circuit, wherein by detecting a variation rate of a driving current with respect to time and adjusting associated operation parameters, the wireless power receiver circuit is prevented from being damaged when the power level required by the load in the wireless power receiver circuit drops rapidly in a short time to cause the level of the receiving voltage Vre to exceed the OVP threshold VOV.

SUMMARY OF THE INVENTION

From one perspective, the present invention provides a wireless power transmitter circuit, comprising: a power stage circuit, which includes a plurality of switches and which is coupled to a resonant transmitter circuit, wherein the resonant transmitter circuit includes a transmission coil and a resonant capacitor which are coupled to each other; and a transmission control circuit, which is configured to operably control the power stage circuit to convert an input power to a driving power according to a pulse width modulation (PWM) control signal in a situation where a corresponding wireless power receiver circuit is near by the resonant transmitter circuit, wherein the driving power drives the resonant transmitter circuit to generate a wireless transmitting power which is supplied to the corresponding wireless power receiver circuit; wherein when a variation rate of a driving current of the driving power with respect to time exceeds a variation rate threshold, an operation parameter of the power stage circuit is adjusted to reduce a power level of the wireless transmitting power.

In one embodiment, by reducing the power level of the wireless transmitting power, the corresponding wireless power receiver circuit is prevented from being damaged when a receiving voltage generated by the corresponding wireless power receiver circuit when the corresponding wireless power receiver circuit receives and converts the wireless transmitting power exceeds an over voltage protection (OVP) threshold.

In one embodiment, the variation rate with respect to time and the variation rate threshold are both negative values.

In one embodiment, the variation rate of the driving current with respect to time is a variation amount of the driving current within a predetermined detection period.

In one embodiment, an adjustment amount of the operation parameter is correlated with an absolute value of the variation amount of the driving current within the predetermined detection period.

In one embodiment, the operation parameter includes at least one of following: a pulse width modulation (PWM) frequency of the power stage circuit; a duty ratio of the power stage circuit; or an input voltage of the input power.

In one embodiment, when the variation amount of the driving current within the predetermined detection period exceeds a first variation amount threshold, (1) the PWM frequency is positively correlated to the absolute value of the variation amount of the driving current within the predetermined detection period, (2) the duty ratio is negatively correlated to the absolute value of the variation amount of the driving current within the predetermined detection period, and/or (3) the input voltage is negatively correlated to the absolute value of the variation amount of the driving current within the predetermined detection period, wherein a quotient of the first variation amount threshold divided by the predetermined detection period corresponds to the variation amount threshold.

In one embodiment, when the variation amount of the driving current within the predetermined detection period exceeds a second variation amount threshold, (1) the PWM frequency is clamped at a PWM frequency limit, (2) the duty ratio is clamped at a duty ratio limit, and/or (3) the input voltage is clamped at an input voltage limit.

In one embodiment, after the power level of the wireless transmitting power is reduced, the wireless power transmitter circuit controls the power level of the wireless transmitting power further according to a demand supplied by the corresponding wireless power receiver circuit via in-band communication.

In one embodiment, the transmission control circuit includes: a current sensing circuit, which is configured to operably sense a sensing current related to the driving current, so as to generate a current sensing signal; and an internal control circuit, which is configured to operably adjust the operation parameter according to the current sensing signal.

In one embodiment, the wireless power transmitter circuit further comprises: a pre-stage power conversion circuit including a plurality of switches, wherein the pre-stage power conversion circuit is configured to operably convert a pre-stage power to the input power, wherein the internal control circuit is further configured to operably control the pre-stage power conversion circuit.

From another perspective, the present invention provides a transmission control circuit for use in a wireless power transmitter circuit, wherein the wireless power transmitter circuit includes: a power stage circuit, which includes a plurality of switches and which is coupled to a resonant transmitter circuit, wherein the resonant transmitter circuit includes a transmission coil and a resonant capacitor which are coupled to each other; wherein the transmission control circuit is configured to operably control the power stage circuit to convert an input power to a driving power according to a pulse width modulation (PWM) control signal in a situation where a corresponding wireless power receiver circuit is near by the resonant transmitter circuit, wherein the driving power drives the resonant transmitter circuit to generate a wireless transmitting power which is supplied to the corresponding wireless power receiver circuit; wherein when a variation rate of a driving current of the driving power with respect to time exceeds a variation rate threshold, an operation parameter of the power stage circuit is adjusted to reduce a power level of the wireless transmitting power; the transmission control circuit comprising: a current sensing circuit, which is configured to operably sense a sensing current related to the driving current, so as to generate a current sensing signal; and an internal control circuit, which is configured to operably adjust the operation parameter according to the current sensing signal.

From yet another perspective, the present invention provides a transmission control method for controlling a wireless power transmitter circuit, wherein the wireless power transmitter circuit includes: a power stage circuit, which includes a plurality of switches and which is coupled to a resonant transmitter circuit, wherein the resonant transmitter circuit includes a transmission coil and a resonant capacitor which are coupled to each other; the transmission control method comprising following steps: controlling the power stage circuit to convert an input power to a driving power according to a pulse width modulation (PWM) control signal in a situation where a corresponding wireless power receiver circuit is near by the resonant transmitter circuit, and driving the resonant transmitter circuit to generate a wireless transmitting power which is supplied to the corresponding wireless power receiver circuit; and when a variation rate of a driving current of the driving power with respect to time exceeds a variation rate threshold, adjusting an operation parameter of the power stage circuit, so as to reduce a power level of the wireless transmitting power.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 2:
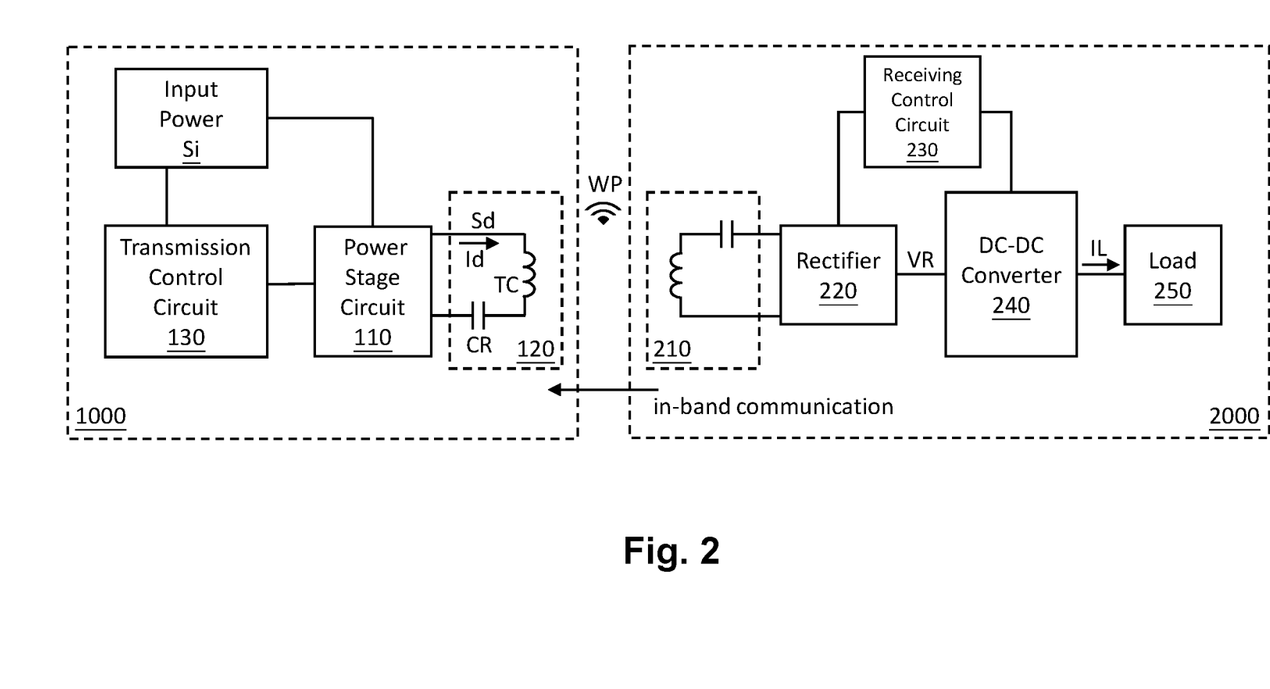
FIG. 2 shows a schematic block diagram of a wireless power transmitter circuit according to an embodiment of the present invention.

Please refer to FIG. 2, which shows a schematic block diagram of a wireless power transmitter circuit according to an embodiment of the present invention. In one embodiment, as shown in FIG. 2, the wireless power transmitter circuit 1000 comprises: a power stage circuit 110, a resonant transmitter circuit 120, a transmission control circuit 130 and an input power Si, wherein the input power Si has a DC input voltage Vin. The power stage circuit 110 includes plural switches and is coupled to the resonant transmitter circuit 120. The resonant transmitter circuit 120 includes a transmission coil TC (i.e., an inductor) and a resonant capacitor CR which are coupled to each other. The resonant transmitter circuit 120 has a resonant frequency, wherein the resonant frequency is correlated with an inductance of the transmission coil TC and a capacitance of the resonant capacitor CR. In one embodiment, the power stage circuit 110 and the resonant transmitter circuit 120 constitute an inverter. In one embodiment, the transmission control circuit 130 is configured to operably control the power stage circuit 110 to convert an input power Si to a driving power Sd according to a pulse width modulation (PWM) control signal in a situation where a corresponding wireless power receiver circuit (i.e., wireless power receiver circuit 2000 in this embodiment) is near by the resonant transmitter circuit 120; in this case, the transmission control circuit 130 is in a power supply stage, wherein the driving power Sd drives the resonant transmitter circuit 120 to generate a wireless transmitting power WP which is supplied to the corresponding wireless power receiver circuit 2000.

In one embodiment, as shown in FIG. 2, the wireless power receiver circuit 2000 includes: a resonant receiver circuit 210, a rectifier 220, a receiving control circuit 230, a DC-DC converter 240 and a load 250. In one embodiment, the DC-DC converter 240 can be for example a linear regulator or a DC-to-DC switching converter. In this embodiment, the resonant receiver circuit 210 receives the wireless transmitting power WP generated by the resonant transmitter circuit 120. The received wireless transmitting power WP is rectified by the rectifier 220, and is next regulated by the DC-DC converter 240, to generate a power which is supplied to the load 250. In one embodiment, an in-band communication can be executed between the resonant transmitter circuit 120 and the resonant receiver circuit 210.

Figure 3A:
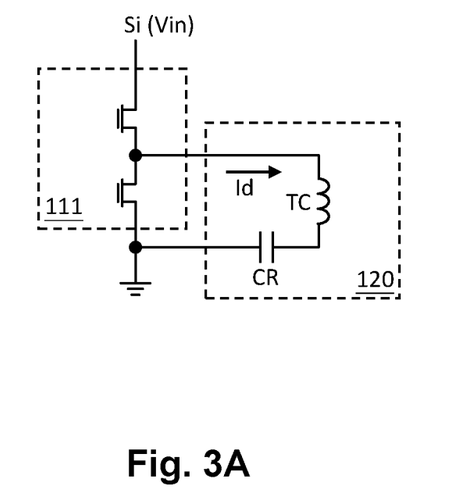
FIG. 3A and FIG. 3B show schematic diagrams of two embodiments of a power stage circuit in a wireless power transmitter circuit according to the present invention.
Figure 3B:
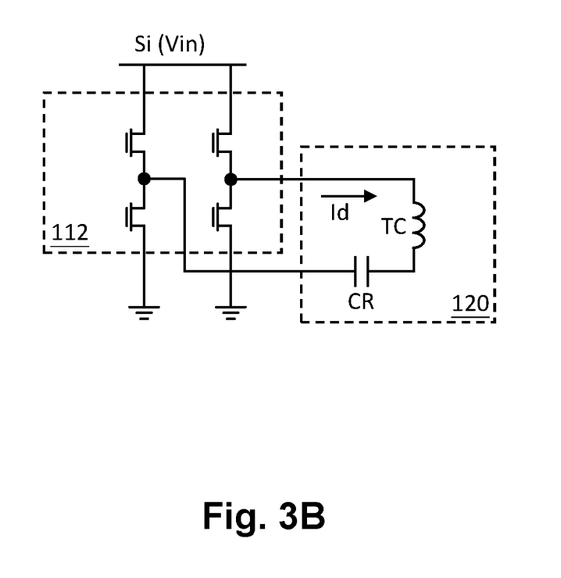

Please refer to FIG. 3A and FIG. 3B. FIG. 3A and FIG. 3B show schematic diagrams of two embodiments of a power stage circuit in a wireless power transmitter circuit according to the present invention. In one embodiment, the power stage circuit 110 can be for example a half-bridge type power stage circuit 111 (as shown in FIG. 3A) or a full-bridge type power stage circuit 112 (as shown in FIG. 3B).

Figure 4:
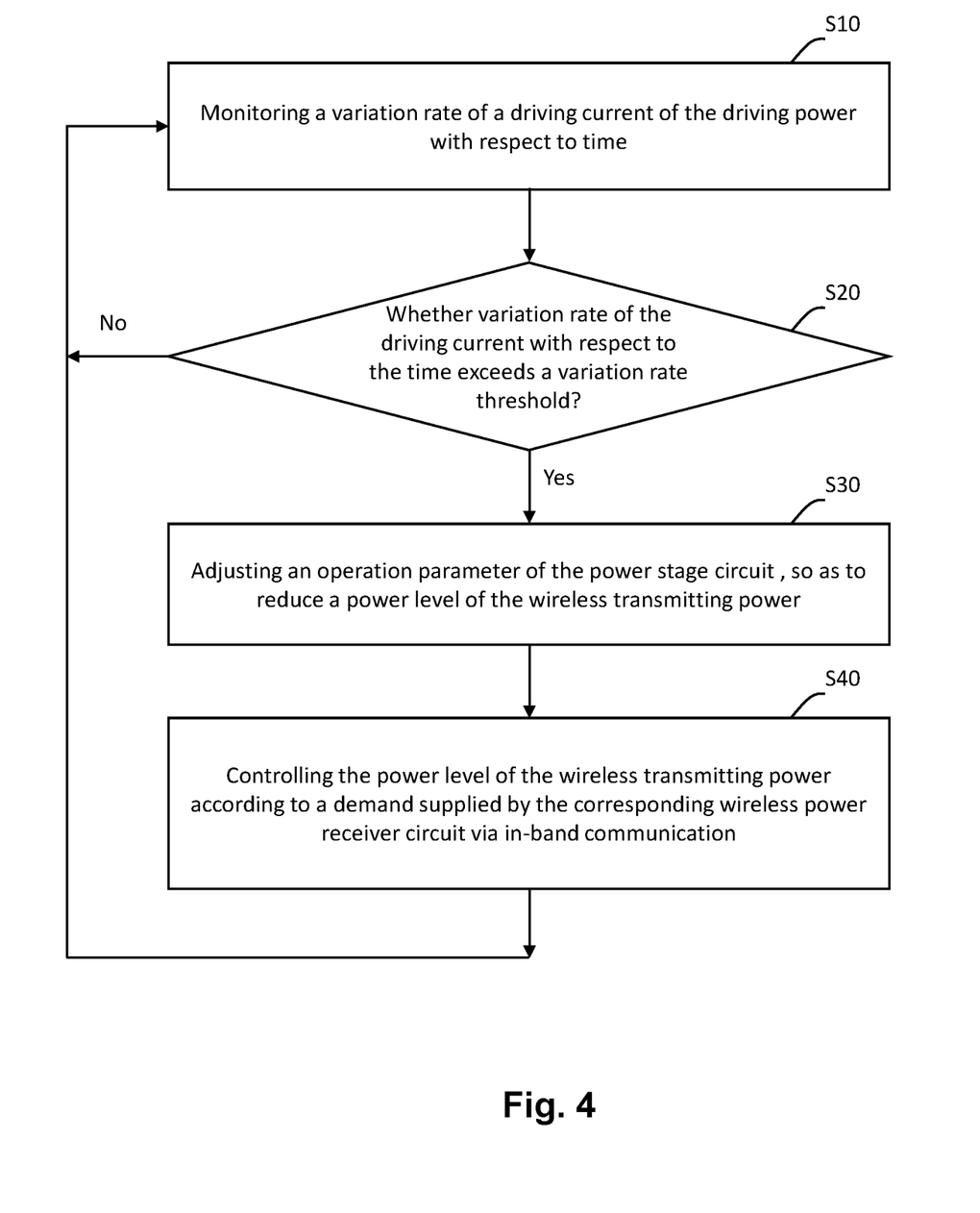
FIG. 4 shows an operation flowchart diagram demonstrating how a wireless power transmitter circuit according to an embodiment of the present invention prevents a wireless power receiver circuit from being damaged.

Please refer to FIG. 2 in conjunction with FIG. 4. FIG. 4 shows an operation flowchart diagram demonstrating how a wireless power transmitter circuit according to an embodiment of the present invention prevents a wireless power receiver circuit from being damaged. In one embodiment, the wireless power transmitter circuit 1000 supplies the wireless power WP to the corresponding wireless power receiver circuit 2000, while in the meantime, the wireless power transmitter circuit 1000 can prevent the wireless power receiver circuit 2000 from being damaged by steps including: a step S10, a step S20, a step S30 and a step S40.

In one embodiment, the step S10 includes: monitoring a variation rate of a driving current Id of the driving power Sd with respect to time. Next, the method proceeds to the step S20: determining whether the variation rate of the driving current Id with respect to time exceeds a variation rate threshold. When the variation rate of the driving current Id with respect to time exceeds the variation rate threshold, the method proceeds to the step S30: adjusting an operation parameter Op of the power stage circuit 110, so as to reduce a power level of the wireless transmitting power WP; otherwise (i.e., when the variation rate of the driving current Id with respect to time does not exceed the variation rate threshold), the method proceeds back to the step S10. In one embodiment, after the step S30, the method proceeds to the step S40: controlling the power level of the wireless transmitting power WP according to a demand supplied by the corresponding wireless power receiver circuit 2000 via in-band communication. In one embodiment, after the step S40 ends and when the wireless power transmitter circuit 1000 enters a next power supply stage, the method proceeds back to the step S10. In one embodiment, the driving current Id is correlated with a current flowing through the transmission coil TC or a current flowing through the resonant capacitor CR.

Figure 5:
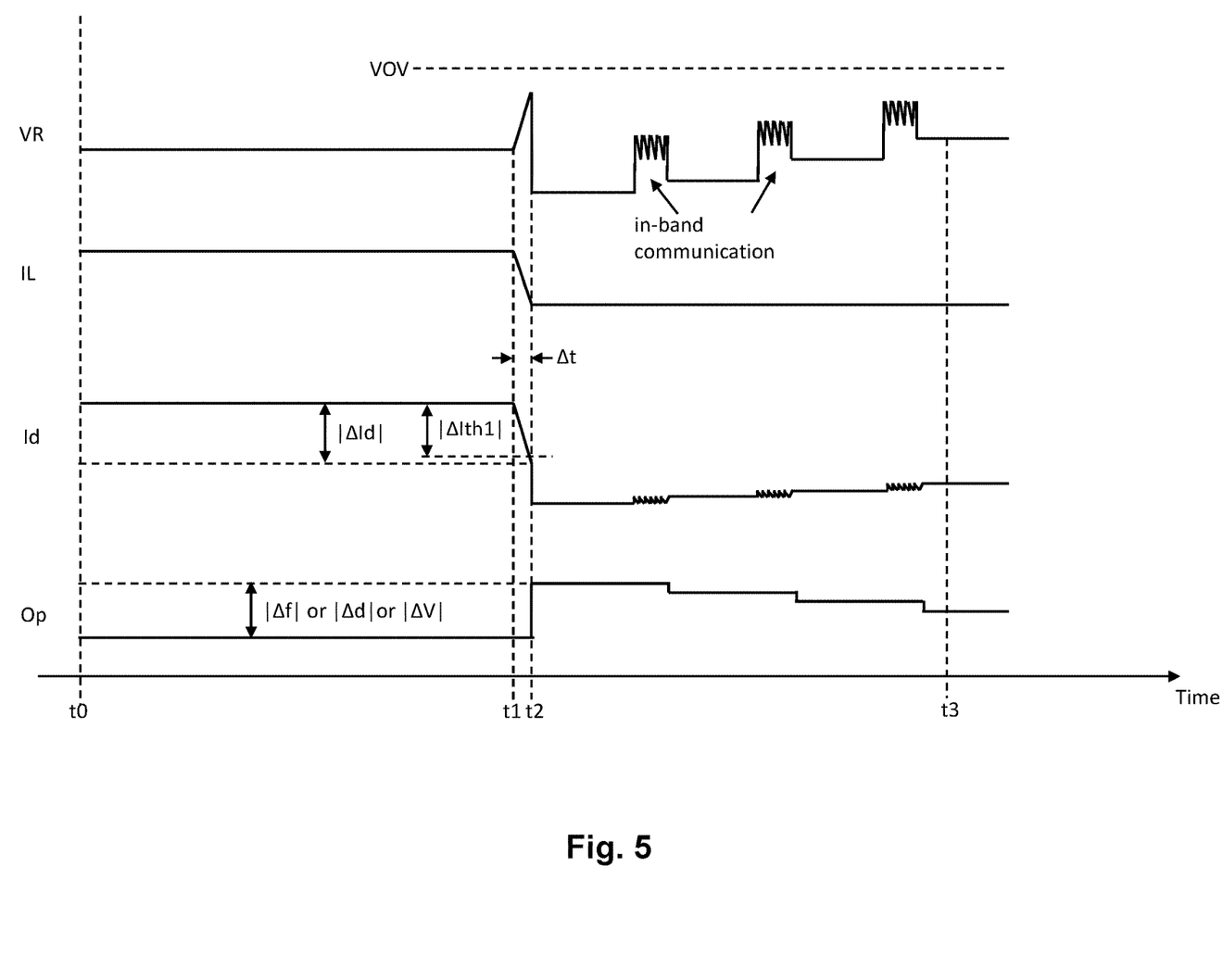
FIG. 5 illustrates a signal waveform diagram depicting the operation of a wireless power transmitter circuit during a power supply stage according to an embodiment of the present invention.

Please refer to FIG. 2 along with FIG. 4 and FIG. 5. FIG. 5 illustrates a signal waveform diagram depicting the operation of a wireless power transmitter circuit during a power supply stage according to an embodiment of the present invention. In one embodiment, as shown by the period from time point t0 to time point t1 in FIG. 5, the wireless power transmitter circuit 1000 supplies the wireless power WP to the corresponding wireless power receiver circuit 2000. During this period, the power level required by the load 250 is relatively higher. For example, as shown in FIG. 5, during the period from time point t0 to time point t1, the load current IL has a high level, whereas, the level of a receiving voltage VR of the wireless power receiver circuit 2000 remains at a normal operation level, that is, below the over voltage protection (OVP) threshold VOV. The aforementioned receiving voltage VR is generated by the wireless power receiver circuit 2000 when the wireless power receiver circuit 2000 receives and converts the wireless transmitting power WP. During the period from time point t0 to time point t1 in FIG. 5, because the level of the driving current Id does not vary, the variation rate of the driving current Id with respect to time does not exceed the variation rate threshold. As a result, in this case, the step S10 and the step S20 are repeatedly executed.

In one embodiment, during the period from time point t1 to time point t2 in FIG. 5, the power level required by the load 250 suddenly drops (e.g., the level of the load current IL is suddenly reduced). In this embodiment, when the level of the load current IL is suddenly reduced during the period from time point t1 to time point t2, the level of the driving current Id is also suddenly reduced. Consequently, during the period from time point t1 to time point t2, the driving current Id has a variation amount $\Delta Id$. Because the absolute value of the variation amount $\Delta Id$ is relatively greater (i.e., the absolute value of the variation amount $\Delta Id$ exceeds the first variation amount threshold $\Delta Ith1$) and because the time difference $\Delta t$ between time point t1 and time point t2 is very small, the variation rate of the driving current Id with respect to time exceeds the variation rate threshold. As a consequence, under this circumstance, the wireless power transmitter circuit 1000 proceeds to the step S30 at time point t2, wherein in the step S30, the wireless power transmitter circuit 1000 adjusts an operation parameter Op of the power stage circuit 110, so as to reduce the power level of the wireless transmitting power WP, thereby reducing the level of the receiving voltage VR (as shown at time point t2 in FIG. 5). As such, the wireless power receiver circuit 2000 is prevented from being damaged when the level of the receiving voltage VR exceeds the OVP threshold VOV. Several specific embodiments as to how the operation parameter Op is adjusted will be fully described later.

In one embodiment, the variation rate of the driving current Id with respect to time is defined as: a variation amount (e.g., variation amount $\Delta Id$) of the driving current Id within a predetermined detection period (e.g., $\Delta t$). That is, the variation rate of the driving current Id with respect to time can be represented as: $\Delta Id/\Delta t$. From one perspective, when the variation amount $\Delta Id$ of the driving current Id within the predetermined detection period $\Delta t$ exceeds a first variation amount threshold $\Delta Ith1$, it indicates that the variation rate of the driving current Id with respect to time exceeds the variation rate threshold. To elaborate in more detail, in one embodiment, the present invention can continuously sense the driving current Id in analog fashion and perform a differentiation operation on the driving current Id to obtain the variation rate of the driving current Id; or, alternatively, in another embodiment, the present invention can sample the driving current Id in digital fashion by a time interval which is equal to or less than Δt, so as to obtain the variation rate of the driving current Id.

In addition, it is worthwhile noting that, in the aforementioned embodiment, the variation rate with respect to time is a negative value; besides, the variation rate threshold or the first variation amount threshold ΔIth1 is also a negative value. This indicates that the level of the driving current Id is decreased as the time is increased. Therefore, the term "exceeds" in the phrase "the variation rate of the driving current Id with respect to time exceeds a variation rate threshold" and the term "exceeds" in the phrase "the variation amount ΔId of the driving current Id within the predetermined detection period Δt exceeds a first variation amount threshold ΔIth1", means being lower than a negative value or being higher than an absolute value.

Please still refer to FIG. 2 to FIG. 5. Subsequent to time point t2 in FIG. 5, after the power level of the wireless transmitting power WP is reduced, the wireless power transmitter circuit 1000 will proceed to the step S40: controlling the power level of the wireless transmitting power WP according to a demand supplied by the corresponding wireless power receiver circuit 2000 via in-band communication, so that the power level of the wireless transmitting power WP reaches a new steady state, to fulfill the demand by the wireless power receiver circuit 2000, as shown by the period from time point t2 to time point t3 in FIG. 5.

Figure 6A:
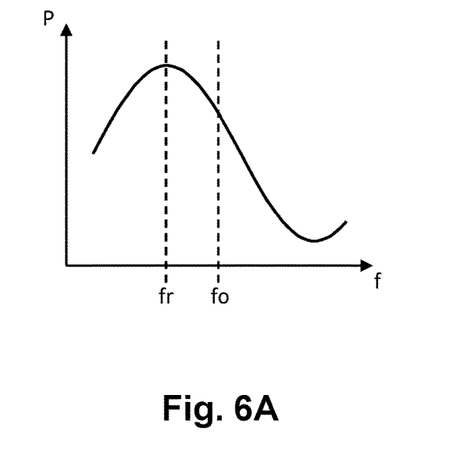
FIG. 6A shows a power-frequency relationship diagram of the power of a wireless transmitting power versus the pulse width modulation frequency of a wireless power receiver circuit according to an embodiment of the present invention.
Figure 6B:
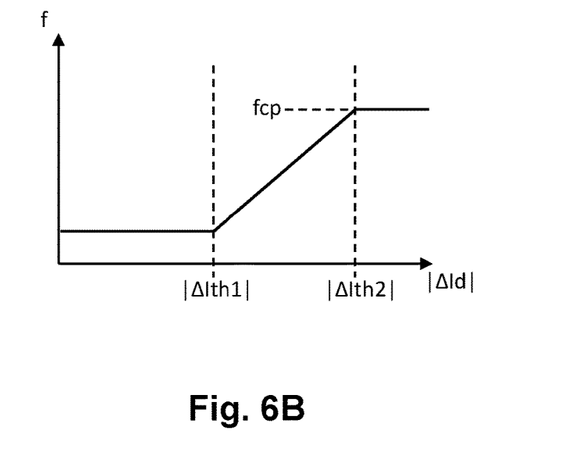
FIG. 6B to FIG. 6D show relationship diagrams of operation parameters versus absolute values of a variation amount of a driving current in a wireless power receiver circuit according to several embodiments of the present invention.
Figure 6C:
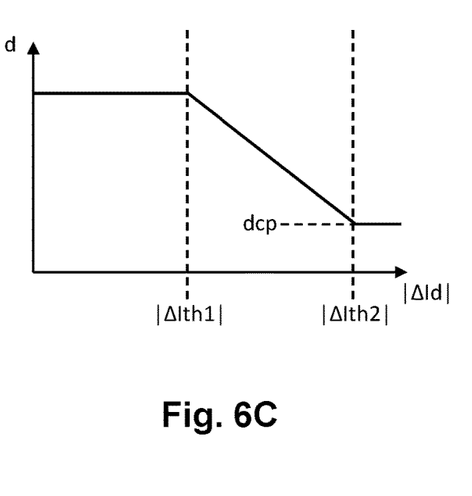
Figure 6D:
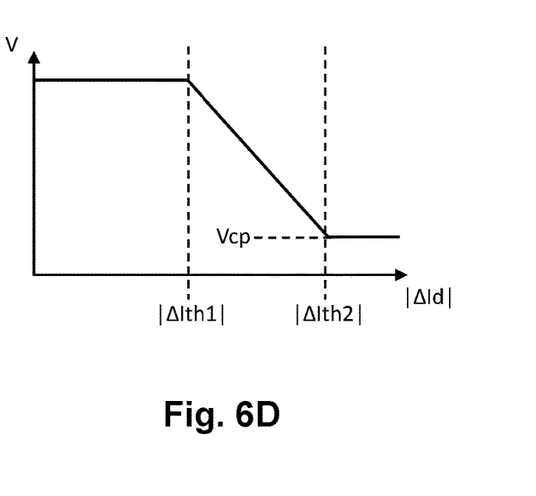

Please refer to FIG. 5 in conjunction with FIG. 6A to FIG. 6D. FIG. 6A shows a power-frequency relationship diagram of the power of a wireless transmitting power versus the pulse width modulation frequency of a wireless power receiver circuit according to an embodiment of the present invention. FIG. 6B to FIG. 6D show relationship diagrams of operation parameters versus absolute values of a variation amount of a driving current in a wireless power receiver circuit according to the present invention. In one embodiment, the operation parameter Op includes at least one of the following: a pulse width modulation (PWM) frequency f of the power stage circuit 110; a duty ratio d of the power stage circuit 110; or an input voltage yin of the input power Si. That is, according to the present invention, by adjusting the PWM frequency f, the duty ratio d and the input voltage Vin, the present invention can reduce the power level of the wireless transmitting power WP, thereby reducing the level of the receiving voltage VR.

Besides, in one embodiment, as shown in FIG. 6B to FIG. 6D, an adjustment amount of the operation parameter is determined according to the absolute value of the variation amount ΔId of the driving current Id within the predetermined detection period Δt, which will be explained by examples described below.

In one embodiment, as shown in FIG. 6A, the operation frequency fo is slightly greater than a resonant frequency fr. In this embodiment, when the operation frequency fo is adjusted upward, the operation frequency fo will become farther away from the resonant frequency fr, whereby the power level of the wireless transmitting power WP will be reduced. As shown in FIG. 6B, in one embodiment, when the variation amount ΔId of the driving current Id within the predetermined detection period Δt exceeds the first variation amount threshold ΔIth1 (in this embodiment, it indicates that the absolute value of the variation amount ΔId is greater than the absolute value of the first variation amount threshold ΔIth1), the PWM frequency f is adjusted in positive correlation to the absolute value of the variation amount ΔId of the driving current Id within the predetermined detection period Δt (in this embodiment, the positive correlation is a proportional relationship, as shown in FIG. 6B). In another embodiment, when the variation amount ΔId of the driving current Id within the predetermined detection period Δt exceeds the first variation amount threshold ΔIth1, the duty ratio d is adjusted in negative correlation to the absolute value of the variation amount ΔId of the driving current Id within the predetermined detection period Δt (in this embodiment, the negative correlation is to adjust the duty ratio d in negative linear correlation, as shown in FIG. 6C). In another embodiment, when the variation amount ΔId of the driving current Id within the predetermined detection period Δt exceeds the first variation amount threshold ΔIth1, the input voltage Vin is adjusted in negative correlation to the absolute value of the variation amount ΔId of the driving current Id within the predetermined detection period Δt (in this embodiment, the negative correlation is to adjust the input voltage Vin in negative linear correlation, as shown in FIG. 6D). In view of the above, according to the present invention, when the variation amount ΔId of the driving current Id within the predetermined detection period Δt exceeds the first variation amount threshold ΔIth1 (i.e., when the variation rate of the driving current Id with respect to time exceeds the variation rate threshold, which corresponds to time point t2 in FIG. 5), by adjusting the PWM frequency f upward, by adjusting the duty ratio d lower, and/or by adjusting the input voltage Vin lower, the present invention can reduce the power level of the wireless transmitting power WP, thereby reducing the level of the receiving voltage VR, to prevent the wireless power receiver circuit 2000 from being damaged.

It is worthwhile noting that, in the aforementioned embodiment, the first variation amount threshold ΔIth1 is a negative value. A quotient (ΔIth1/Δt) of the first variation amount threshold ΔIth1 divided by the predetermined detection period Δt corresponds to the variation amount threshold. Besides, in one embodiment, as shown in FIG. 5, the adjustment amount of the operation parameter Op is correlated with the absolute value of the variation amount ΔId of the driving current Id within the predetermined detection period Δt, wherein the adjustment amount of the operation parameter Op can be for example an absolute value of a variation amount Δf of the PWM frequency f, an absolute value of a variation amount Δd of the duty ratio d, or an absolute value of a variation amount ΔV of the input voltage Vin.

Please still refer to FIG. 6B to FIG. 6D. In one embodiment, when the variation amount ΔId of the driving current Id within the predetermined detection period Δt exceeds the second variation amount threshold ΔIth2, the PWM frequency f is clamped at a PWM frequency limit fcp, and/or the duty ratio d is clamped at a duty ratio limit dcp, and/or the input voltage is clamped at an input voltage limit Vcp.

Figure 7A:
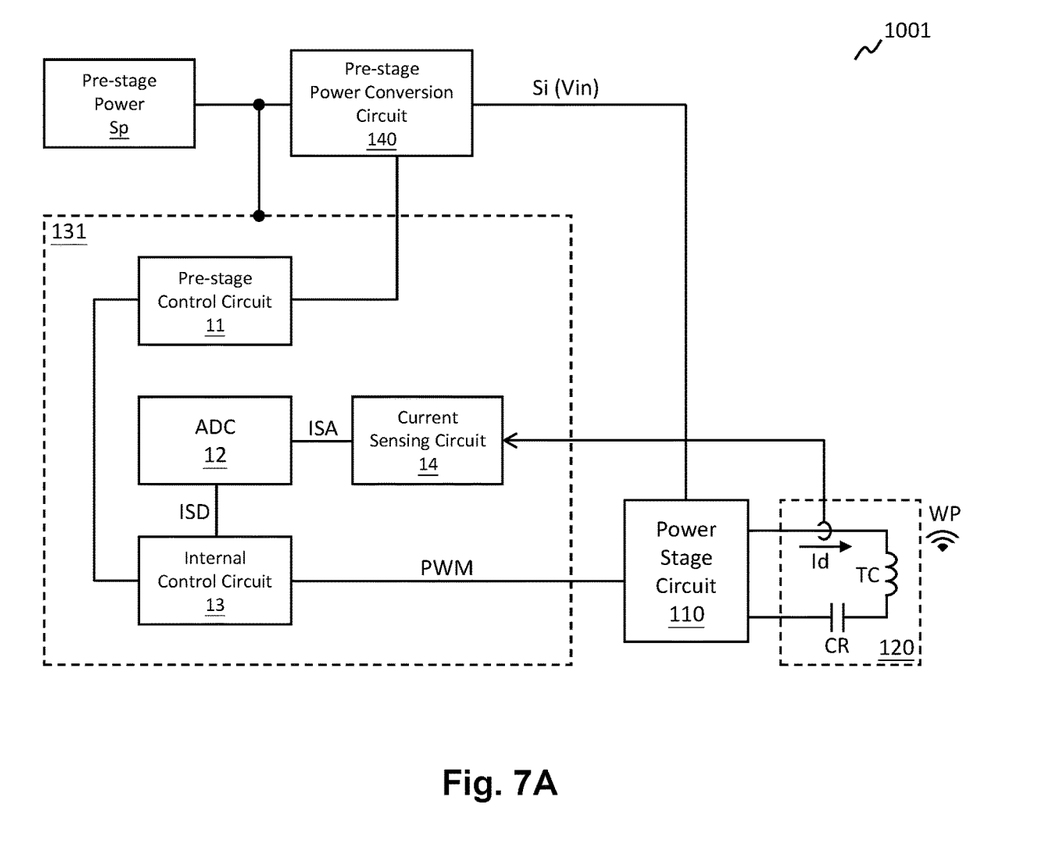
FIG. 7A shows a schematic diagram of a wireless power transmitter circuit according to an embodiment of the present invention.

Please refer to FIG. 7A, which shows a schematic diagram of a wireless power transmitter circuit according to an embodiment of the present invention. The wireless power transmitter circuit 1001 of this embodiment shown in FIG. 7A is similar to the wireless power transmitter circuit 1000 of the embodiment shown in FIG. 2. In one embodiment, the wireless power transmitter circuit 1001 further comprises: a pre-stage power Sp, a pre-stage power conversion circuit 140, a transmission control circuit 131 including a pre-stage control circuit 11, an analog-to-digital converter (ADC) 12 and an internal control circuit 13, and a current sensing circuit 14. In one embodiment, as shown in FIG. 7A, the pre-stage power conversion circuit 140 includes at least one switch and an inductor, and the pre-stage power conversion circuit 140 is configured to operably convert a pre-stage power Sp to the input power Si, wherein the pre-stage power Sp can be an alternating current (AC) power or a direct current (DC) power. The pre-stage control circuit 11 is configured to operably control the pre-stage power conversion circuit 140. In one embodiment, the current sensing circuit 14 is configured to operably sense a sensing current related to the driving current Id, so as to generate a current sensing signal ISA. In this embodiment, the sensing current is the driving current Id. In one embodiment, the ADC 12 is configured to operably convert the current sensing signal ISA to a digital current sensing signal ISD. In one embodiment, the internal control circuit 13 is configured to operably adjust the operation parameter Op according to the digital current sensing signal ISD, to generate PWM signal PWM for controlling the plural switches of the power stage circuit 110. Additionally, the internal control circuit 13 is further configured to operably control the pre-stage control circuit 11.

Figure 7B:
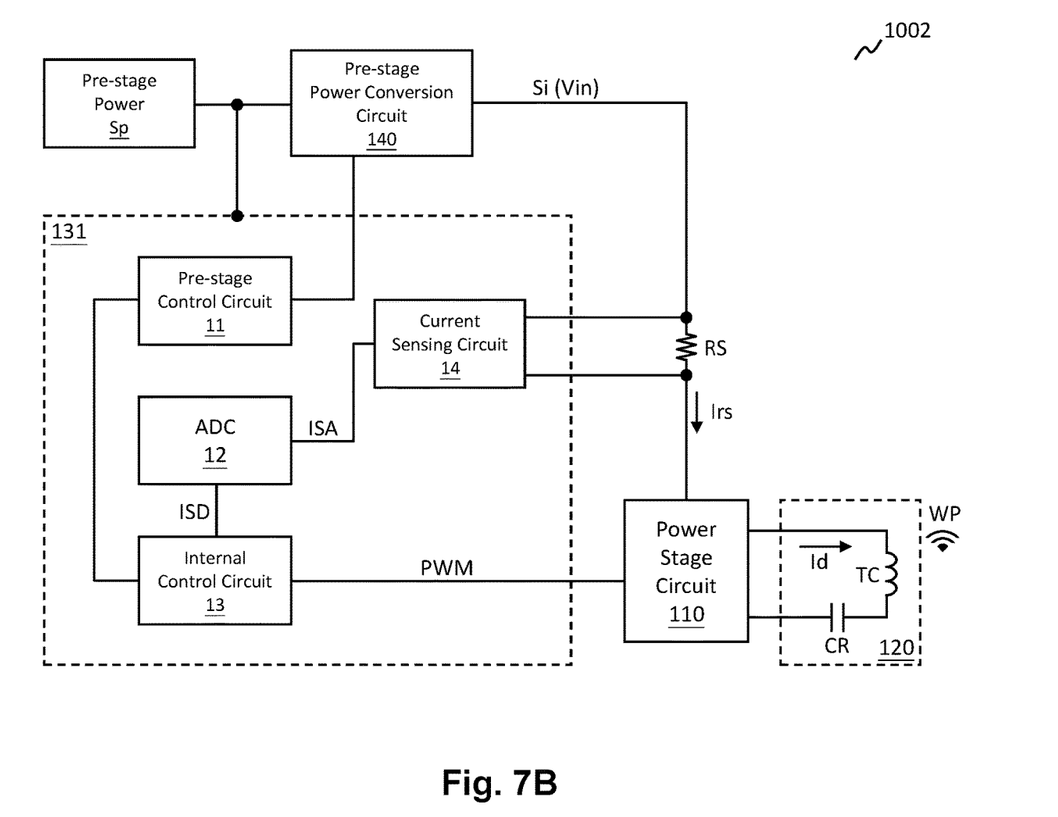
FIG. 7B shows a schematic diagram of a wireless power transmitter circuit according to an embodiment of the present invention.
Figure 8A:
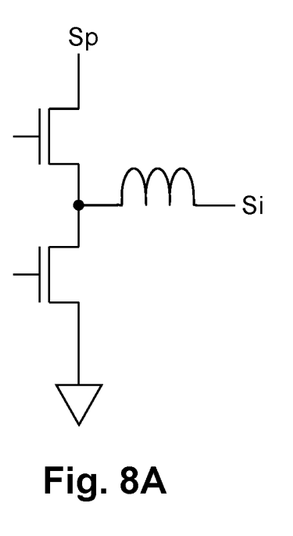
FIG. 8A to FIG. 8J show several embodiments of a pre-stage power conversion circuit of a wireless power transmitter circuit according to the present invention.
Figure 8B:
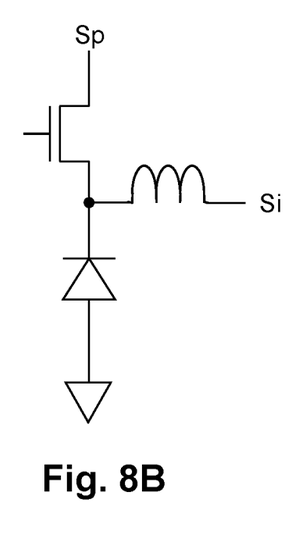
Figure 8C:
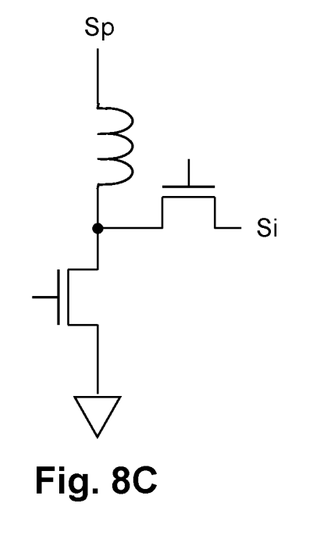
Figure 8D:
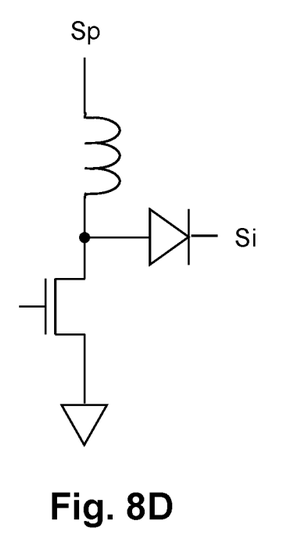
Figure 8E:
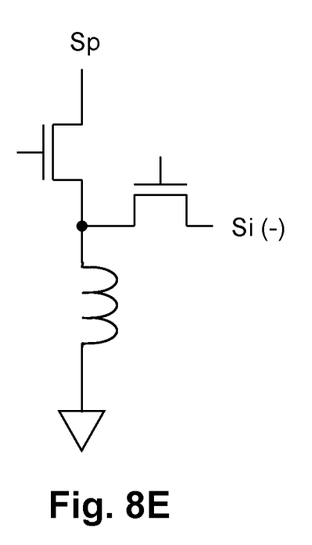
Figure 8F:
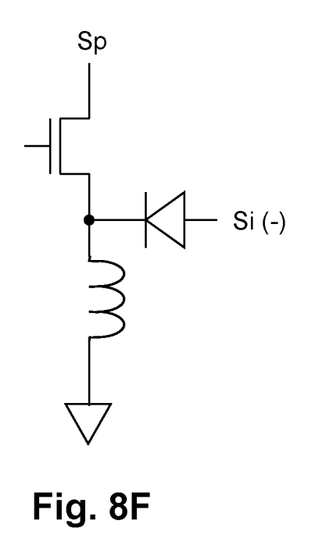
Figure 8G:
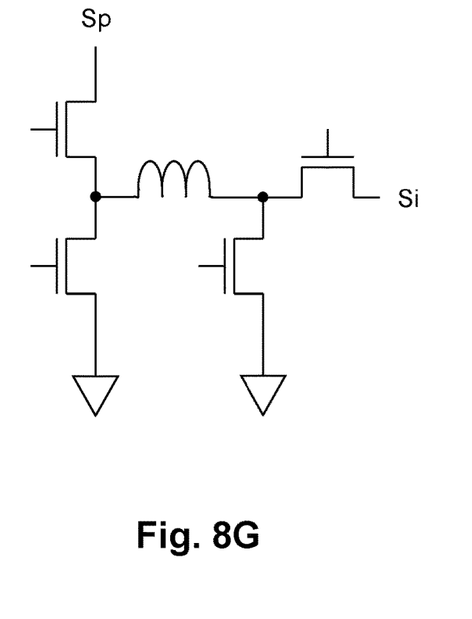
Figure 8H:
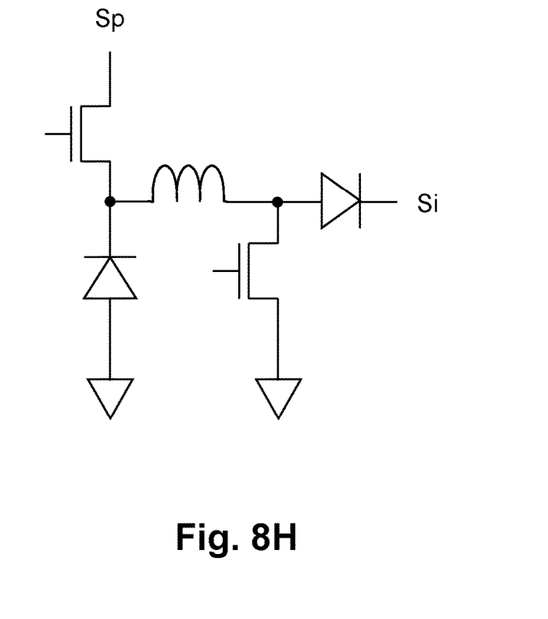
Figure 8I:
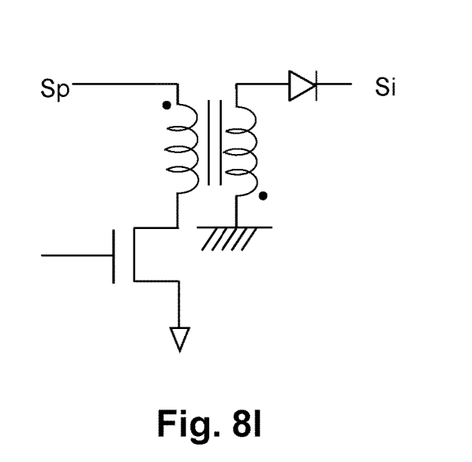
Figure 8J:
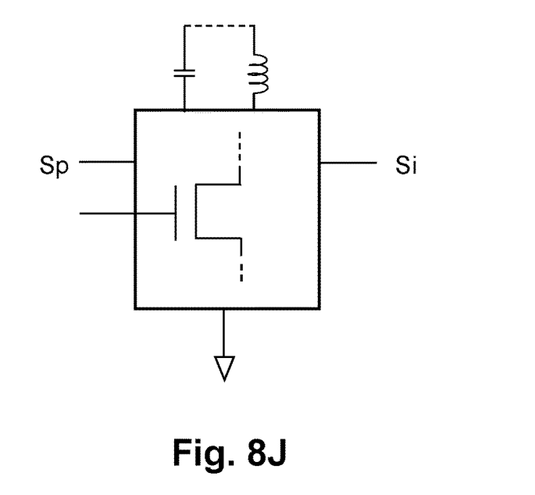

Please refer to FIG. 7B, which shows a schematic diagram of a wireless power transmitter circuit according to an embodiment of the present invention. The wireless power transmitter circuit 1002 of this embodiment shown in FIG. 7B is similar to the wireless power transmitter circuit 1001 of the embodiment shown in FIG. 7A, but is different in that: in one embodiment, the wireless power transmitter circuit 1002 of this embodiment shown in FIG. 7B further comprises a sensing resistor RS. More specifically, the current sensed by the current sensing circuit 14 of this embodiment shown in FIG. 7B is different from the current sensed by the current sensing circuit 14 of the embodiment shown in FIG. 7A. In the embodiment shown in FIG. 7B, it is the current Irs flowing through the sensing resistor RS that is to be sensed, wherein the current Irs is correlated with the driving current Id. In one embodiment, the current Irs can be for example an input current of the power stage circuit 110.

Please refer to FIG. 8A to FIG. 8J, which show show several embodiments of a pre-stage power conversion circuit of a wireless power transmitter circuit according to the present invention. In one embodiment, the pre-stage power conversion circuit 140 includes at least one switch and an inductor which are coupled to each other, wherein the at least one switch serves to operate the inductor, so as to convert a pre-stage power Sp to an input power Si. As shown in FIG. 8A to FIG. 8J, the pre-stage power conversion circuit 140 includes, for example but not limited to, a boost converter, a buck converter, a buck-boost converter, a flyback converter or a switched tank (STC) converter.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A wireless power transmitter circuit, comprising:
   a power stage circuit, which includes a plurality of switches and which is coupled to a resonant transmitter circuit, wherein the resonant transmitter circuit includes a transmission coil and a resonant capacitor which are coupled to each other; and
   a transmission control circuit, which is configured to operably control the power stage circuit to convert an input power to a driving power according to a pulse width modulation (PWM) control signal in a situation where a corresponding wireless receiver circuit is nearby the resonant transmitter circuit, wherein the driving power drives the resonant transmitter circuit to generate a wireless transmitting power which is supplied to the corresponding wireless power receiver circuit;
   wherein when a variation rate of a driving current of the driving power with respect to time exceeds a variation rate threshold, an operation parameter of the power stage circuit is adjusted to reduce a power level of the wireless transmitting power;
   wherein an adjustment amount of the operation parameter is positively correlated to or negatively correlated to the variation rate of the driving current with respect to time.

2. The wireless power transmitter circuit of claim 1, wherein by reducing the power level of the wireless transmitting power, the corresponding wireless power receiver circuit is prevented from being damaged when a receiving voltage generated by the corresponding wireless power receiver circuit when the corresponding wireless power receiver circuit receives and converts the wireless transmitting power exceeds an over voltage protection (OVP) threshold.

3. The wireless power transmitter circuit of claim 1, wherein the variation rate with respect to time and the variation rate threshold are both negative values.

4. The wireless power transmitter circuit of claim 1, wherein the variation rate of the driving current with respect to time is a variation amount of the driving current within a predetermined detection period.

5. The wireless power transmitter circuit of claim 4, wherein the adjustment amount of the operation parameter is correlated with an absolute value of the variation amount of the driving current within the predetermined detection period.

6. The wireless power transmitter circuit of claim 4, wherein the operation parameter includes at least one of following:
   a pulse width modulation (PWM) frequency of the power stage circuit;
   a duty ratio of the power stage circuit; or
   an input voltage of the input power.

7. The wireless power transmitter circuit of claim 6, wherein when the variation amount of the driving current within the predetermined detection period exceeds a first variation amount threshold,
(1) the PWM frequency is positively correlated to the absolute value of the variation amount of the driving current within the predetermined detection period,
(2) the duty ratio is negatively correlated to the absolute value of the variation amount of the driving current within the predetermined detection period, and/or
(3) the input voltage is negatively correlated to the absolute value of the variation amount of the driving current within the predetermined detection period,
wherein a quotient of the first variation amount threshold divided by the predetermined detection period corresponds to the variation amount threshold.

8. The wireless power transmitter circuit of claim 7, wherein when the variation amount of the driving current within the predetermined detection period exceeds a second variation amount threshold,
(1) the PWM frequency is clamped at a PWM frequency limit,
(2) the duty ratio is clamped at a duty ratio limit, and/or
(3) the input voltage is clamped at an input voltage limit.

9. The wireless power transmitter circuit of claim 8, wherein after the power level of the wireless transmitting power is reduced, the wireless power transmitter circuit controls the power level of the wireless transmitting power further according to a demand supplied by the corresponding wireless power receiver circuit via in-band communication.

10. The wireless power transmitter circuit of claim 6, wherein the transmission control circuit includes:
a current sensing circuit, which is configured to operably sense a sensing current related to the driving current, so as to generate a current sensing signal; and
an internal control circuit, which is configured to operably adjust the operation parameter according to the current sensing signal.

11. The wireless power transmitter circuit of claim 10, further comprising:
a pre-stage power conversion circuit including a plurality of switches, wherein the pre-stage power conversion circuit is configured to operably convert a pre-stage power to the input power, wherein the internal control circuit is further configured to operably control the pre-stage power conversion circuit.

12. A transmission control circuit for use in a wireless power transmitter circuit, wherein the wireless power transmitter circuit includes: a power stage circuit, which includes a plurality of switches and which is coupled to a resonant transmitter circuit, wherein the resonant transmitter circuit includes a transmission coil and a resonant capacitor which are coupled to each other; wherein the transmission control circuit is configured to operably control the power stage circuit to convert an input power to a driving power according to a pulse width modulation (PWM) control signal in a situation where a corresponding wireless power receiver circuit is near by the resonant transmitter circuit, wherein the driving power drives the resonant transmitter circuit to generate a wireless transmitting power which the is supplied to corresponding wireless power receiver circuit; wherein when a variation rate of a driving current of the driving power with respect to time exceeds a variation rate threshold, an operation parameter of the power stage circuit is adjusted to reduce a power level of the wireless transmitting power; the transmission control circuit comprising:
a current sensing circuit, which is configured to operably sense a sensing current related to the driving current, so as to generate a current sensing signal; and
an internal control circuit, which is configured to operably adjust the operation parameter according to the current sensing signal;
wherein an adjustment amount of the operation parameter is positively correlated to or negatively correlated to the variation rate of the driving current with respect to time.

13. The transmission control circuit of wireless power transmitter circuit claim 12, wherein by reducing the power level of wireless the transmitting power, the corresponding wireless power receiver circuit is prevented from being damaged when a receiving voltage generated by the corresponding wireless power receiver circuit when the corresponding wireless power receiver circuit receives and converts the wireless transmitting power exceeds an over voltage protection (OVP) threshold.

14. The transmission control circuit of wireless power transmitter circuit claim 12, wherein the variation rate with respect to time and the variation rate threshold are both negative values.

15. The transmission control circuit of wireless power transmitter circuit claim 12, wherein the variation rate with respect to time is a variation amount of the driving current within a predetermined detection period.

16. The transmission control circuit of wireless power transmitter circuit claim 15, wherein the adjustment amount of the operation parameter is correlated with an absolute value of the variation amount of the driving current within the predetermined detection period.

17. The transmission control circuit of wireless power transmitter circuit claim 15, wherein the operation parameter includes at least one of following:
a pulse width modulation (PWM) frequency of the power stage circuit;
a duty ratio of the power stage circuit; or
an input voltage of the input power.

18. The transmission control circuit of wireless power transmitter circuit claim 17, wherein when the variation amount of the driving current within the predetermined detection period exceeds a first variation amount threshold,
(1) the PWM frequency is positively correlated to the absolute value of the variation amount of the driving current within the predetermined detection period,
(2) the duty ratio is negatively correlated to the absolute value of the variation amount of the driving current within the predetermined detection period, and/or
(3) the input voltage is negatively correlated to the absolute value of the variation amount of the driving current within the predetermined detection period,
wherein a quotient of the first variation amount threshold divided by the predetermined detection period corresponds to the variation amount threshold.

19. The transmission control circuit of wireless power transmitter circuit claim 18, wherein when the variation amount of the driving current within the predetermined detection period exceeds a second variation amount threshold,
(1) the PWM frequency is clamped at a PWM frequency limit,
(2) the duty ratio is clamped at a duty ratio limit, and/or
(3) the input voltage is clamped at an input voltage limit.

20. The transmission control circuit of wireless power transmitter circuit claim 19, wherein after the power level of the wireless transmitting power is reduced, the wireless power transmitter circuit controls the power level of the wireless transmitting power further according to a demand supplied by the corresponding wireless power receiver circuit via in-band communication.

21. A transmission control method for controlling a wireless power transmitter circuit, wherein the wireless power transmitter circuit includes: a power stage circuit, which includes a plurality of switches and which is coupled to a resonant transmitter circuit, wherein the resonant transmitter circuit includes a transmission coil and a resonant capacitor which are coupled to each other; the transmission control method comprising following steps:

controlling the power stage circuit to convert an input power to a driving power according to a pulse width modulation (PWM) control signal in a situation where a corresponding wireless power receiver circuit is near by the resonant transmitter circuit, and driving the transmitter resonant circuit to generate a wireless transmitting power which is supplied to the corresponding wireless power receiver circuit; and when a variation rate of a driving current of the driving power with respect to time exceeds a variation rate threshold, adjusting an operation parameter of the power stage circuit, so as to reduce a power level of the wireless transmitting power;

wherein an adjustment amount of the operation parameter is positively correlated to or negatively correlated to the variation rate of the driving current with respect to time.

22. The transmission control method of the wireless power transmitter circuit claim 21, wherein by reducing the power level of the wireless transmitting the power, corresponding wireless power receiver circuit is prevented from being damaged when a receiving voltage generated by the corresponding wireless power receiver circuit when the corresponding wireless power receiver circuit receives and converts the wireless transmitting power exceeds an over voltage protection (OVP) threshold.

23. The transmission control method of the wireless power transmitter circuit claim 21, wherein the variation rate with respect to time and the variation rate threshold are both negative values.

24. The transmission control method of the wireless power transmitter circuit claim 21, wherein the variation rate with respect to time is a variation amount of the driving current within a predetermined detection period.

25. The transmission control method of the wireless power transmitter circuit claim 24, wherein the adjustment amount of the operation parameter is correlated with an absolute value of the variation amount of the driving current within the predetermined detection period.

26. The transmission control method of the wireless power transmitter circuit claim 24, wherein the operation parameter includes at least one of following:

a pulse width modulation (PWM) frequency of the power stage circuit;
a duty ratio of the power stage circuit; or
an input voltage of the input power.

27. The transmission control method of the wireless power transmitter circuit claim 26, wherein when the variation amount of the driving current within the predetermined detection period exceeds a first variation amount threshold, (1) the PWM frequency is positively correlated to the absolute value of the variation amount of the driving current within the predetermined detection period,
(2) the duty ratio is negatively correlated to the absolute value of the variation amount of the driving current within the predetermined detection period, and/or
(3) the input voltage is negatively correlated to the absolute value of the variation amount of the driving current within the predetermined detection period,
wherein a quotient of the first variation amount threshold divided by the predetermined detection period corresponds to the variation amount threshold.

28. The transmission control method of the wireless power transmitter circuit claim 27, wherein when the variation amount of the driving current within the predetermined detection period exceeds a second variation amount threshold, (1) the PWM frequency is clamped at a PWM frequency limit,
(2) the duty ratio is clamped at a duty ratio limit, and/or
(3) the input voltage is clamped at an input voltage limit.

29. The transmission control method of the wireless power transmitter circuit claim 28, wherein after the power level of the wireless transmitting power is reduced, the wireless power transmitter circuit controls the power level of the wireless transmitting power further according to a demand supplied by the corresponding wireless power receiver circuit via in-band communication.

30. The transmission control method of the wireless power transmitter circuit claim 26, further comprising following steps:

sensing a sensing current related to the driving current, so as to generate a current sensing signal; and
adjusting the operation parameter according to the current sensing signal.

* * * * *